(12) United States Patent
Leung

(10) Patent No.: US 6,574,231 B1
(45) Date of Patent: Jun. 3, 2003

(54) METHOD AND APPARATUS FOR QUEUING DATA FRAMES IN A NETWORK SWITCH PORT

(75) Inventor: Eric Tsin-Ho Leung, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/316,181

(22) Filed: May 21, 1999

(51) Int. Cl.[7] ............................................... H04L 12/28
(52) U.S. Cl. .................... 370/412; 370/395.5; 370/392; 370/397; 709/209; 709/205
(58) Field of Search ............................. 370/398, 395.5, 370/409, 397, 399, 383; 711/147, 209, 130, 205

(56) References Cited

U.S. PATENT DOCUMENTS

| | | | | |
|---|---|---|---|---|
| 5,301,192 A | * | 4/1994 | Henrion ....................... 711/100 |
| 5,432,908 A | * | 7/1995 | Heddes et al. ............... 711/147 |
| 5,515,376 A | | 5/1996 | Murthy et al. |
| 5,610,914 A | * | 3/1997 | Yamada .................. 370/395.72 |
| 5,924,112 A | * | 7/1999 | Barber et al. ................ 711/100 |
| 6,032,190 A | * | 2/2000 | Bremer et al. ............... 709/238 |
| 6,041,397 A | * | 3/2000 | Rickard et al. .............. 711/209 |
| 6,049,850 A | * | 4/2000 | Vishlitzky et al. ........... 711/136 |
| 6,088,745 A | * | 7/2000 | Bertagna et al. ............... 710/56 |
| 6,088,777 A | * | 7/2000 | Sorber ......................... 711/171 |
| 6,092,172 A | * | 7/2000 | Nishimoto et al. .......... 711/207 |
| 6,154,460 A | * | 11/2000 | Kerns et al. ................. 370/398 |
| 6,185,208 B1 | * | 2/2001 | Liao ............................. 370/392 |
| 6,205,501 B1 | * | 3/2001 | Brief et al. .................. 710/100 |
| 6,425,067 B1 | * | 7/2002 | Chong et al. ................ 711/220 |
| 6,438,140 B1 | * | 8/2002 | Jungers et al. .............. 370/471 |

* cited by examiner

Primary Examiner—Dang Ton
Assistant Examiner—Van Nguyen

(57) ABSTRACT

A method and apparatus in a network switch port for providing queuing of data frames as they are transferred from a switch port to an external memory. Multiple buffers within the external memory used to store a single data frame are linked together by writing a next buffer location in each buffer header. Storing linking information within each buffer eliminates the need for a separate memory for storing all the buffer locations used to store a data frame, thereby reducing the complexity and cost of the network switch port.

15 Claims, 11 Drawing Sheets

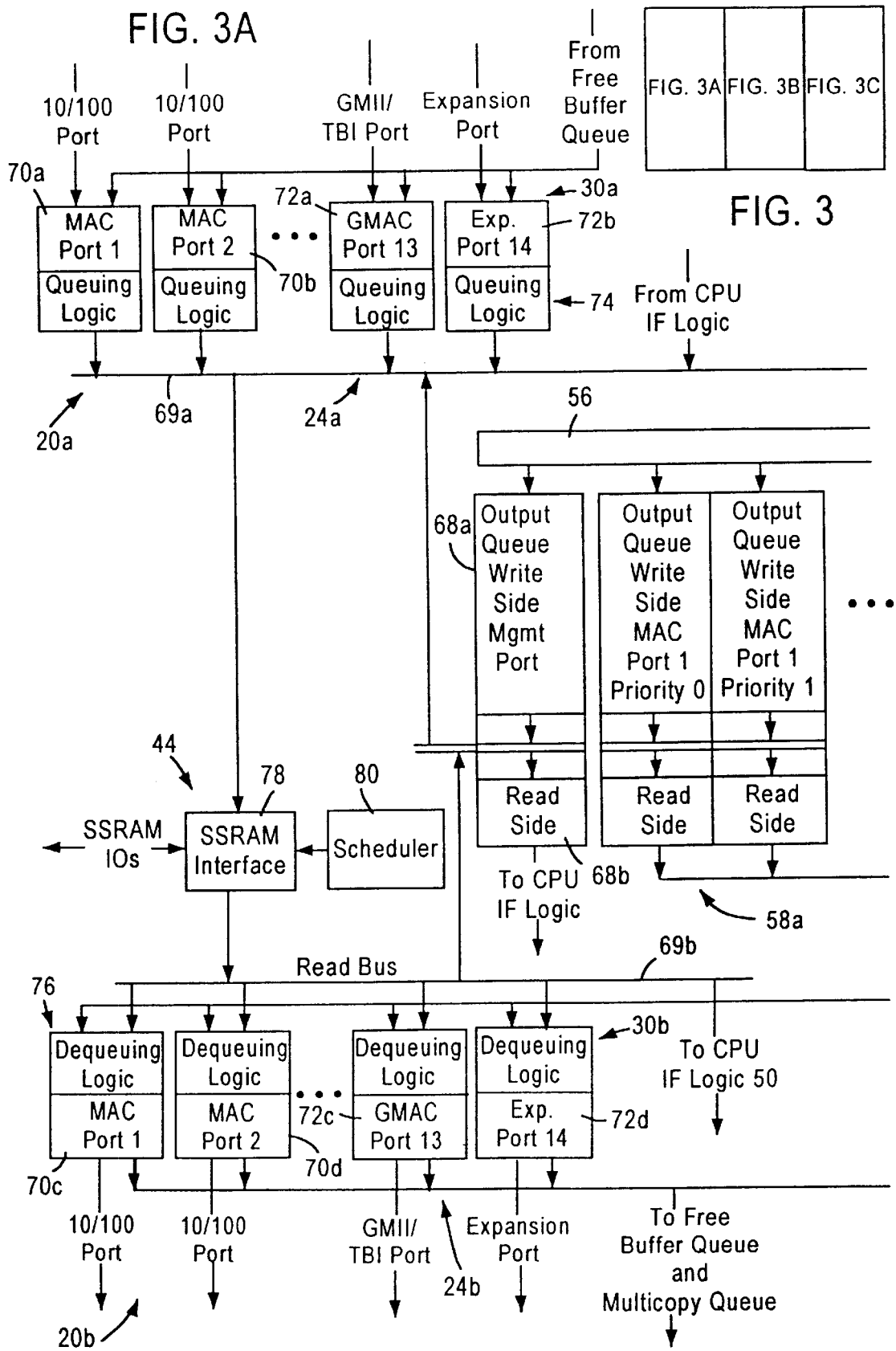

METHOD AND APPARATUS FOR QUEUING DATA FRAMES IN A NETWORK SWITCH PORT

BACKGROUND OF THE INVENTION

Related Applications

Commonly-assigned, co-pending application Ser. No. 09/316,182, filed May 21, 1999, entitled COMMON SCALABLE QUEUING AND DEQUEUING ARCHITECTURE AND METHOD RELATIVE TO NETWORK SWITCH DATA RATE.

FIELD OF THE INVENTION

The present invention relates to networks and more particularly, to a system and method of controlling network traffic data in a switched network operating according to Ethernet (IEEE 802.3) protocol.

BACKGROUND ART

Switched local area networks use a network switch for supplying data frames between network stations or other network nodes, where each network node is connected to the network switch by a media. The switched local area network architecture uses a media access control (MAC) enabling network interfaces within each network node and the network switch to access the media. A network switch stores and forwards data frames received from transmitter nodes to destination nodes based on header information and the data in the received frames, including source and destination addresses. The network switch temporarily stores the data frames as they are passed through the switch in an external memory, such as an SSRAM.

In particular, a multi-port network switch stores and fetches data frames stored in its external memory via read and write buses within the switch connected to each port through a port interface, an external bus, and an external bus interface connecting the read and write busses to the external bus. Each memory storage (i.e., buffer) location within the external memory has a predetermined capacity, such as 256 bytes, for example. If a received data frame exceeds this capacity, the frame must be divided, segmented and stored in two or more buffers within the external memory. In such cases, the data frame is typically stored by a queuing logic operating according to a predetermined queuing operation that sequences (i.e., queues) the individual data frame segments.

When the network switch subsequently transmits the stored data frame at a network switch port, the data frame must be retrieved from the one or more buffers in the external memory. However, in the case where multiple buffers have been used to store the data frame, the data must be retrieved in the same sequence it was stored in order to properly reconstruct the data frame. Hence, the logic required to both sequence and store the data frame segments as well as the complementary logic to retrieve and reconstruct the data frame segments can be complex and costly, especially since all of the individual buffer locations in which the frame segments are stored must be recorded as well as the sequence of those locations.

SUMMARY OF THE INVENTION

There is a need for a queuing method and accompanying logic to sequence data segments without requiring separate storage of the individual storage locations as well as the sequence of those locations. The elimination of separate storage serves to reduce the cost and overall complexity of the network switch. There is also a need for a method and apparatus for queuing data frames to be stored in an external memory that links each address location by storing address information the header of each buffer, rather than in a separate memory.

According to one aspect of the present invention, a method of storing received data in a memory of a network switch includes a step of retrieving first and second memory address pointers from a plurality of available memory address pointers specifying respective storage locations in a memory. Each of the storage locations has a prescribed storage size. The method also includes a steps of receiving at least a portion of a data frame from a network media and writing at least a first portion of the received data frame into a first storage location specified by the first memory address pointer. Additionally, if the entire data frame has a size that exceeds the prescribed storage size of the specified memory location, a second portion of the received data frame is written into a second storage location specified by the second memory address pointer and header information identifying the second memory address pointer is written into the first storage location specified by the first memory address pointer.

According to another aspect of the present invention, a network switch apparatus includes at least one network switch port configured for receiving data frames from network nodes. In addition, a queuing block is included within the at least one network switch port for addressing, transmitting and storing received data frames in an external memory. The queuing block is configured to segment and store each data frame in one or more memory locations within the external memory and write header information into each memory location. Included in the header information is a memory location pointer for pointing to a subsequent memory location when two or more memory locations are required to store a single data frame.

The use of memory locations containing information that points (or "links") to subsequent memory locations by storing pointers within the headers of each memory location in the external memory obviates the need for a separate memory to store and sequence the memory locations. Hence, the present invention is less complex and costly by eliminating the need for a separate memory.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATIVE EMBODIMENTS

The present invention will first be described with the example of a switch in a packet switched network, such as an Ethernet (IEEE 802.3) network. It will become apparent, however, that the present invention is also applicable to other packet switched systems, as described in detail below, as well as to other types of systems in general.

An embodiment of the present invention will then be described concerning the queuing block within the described switch.

Figure 1:
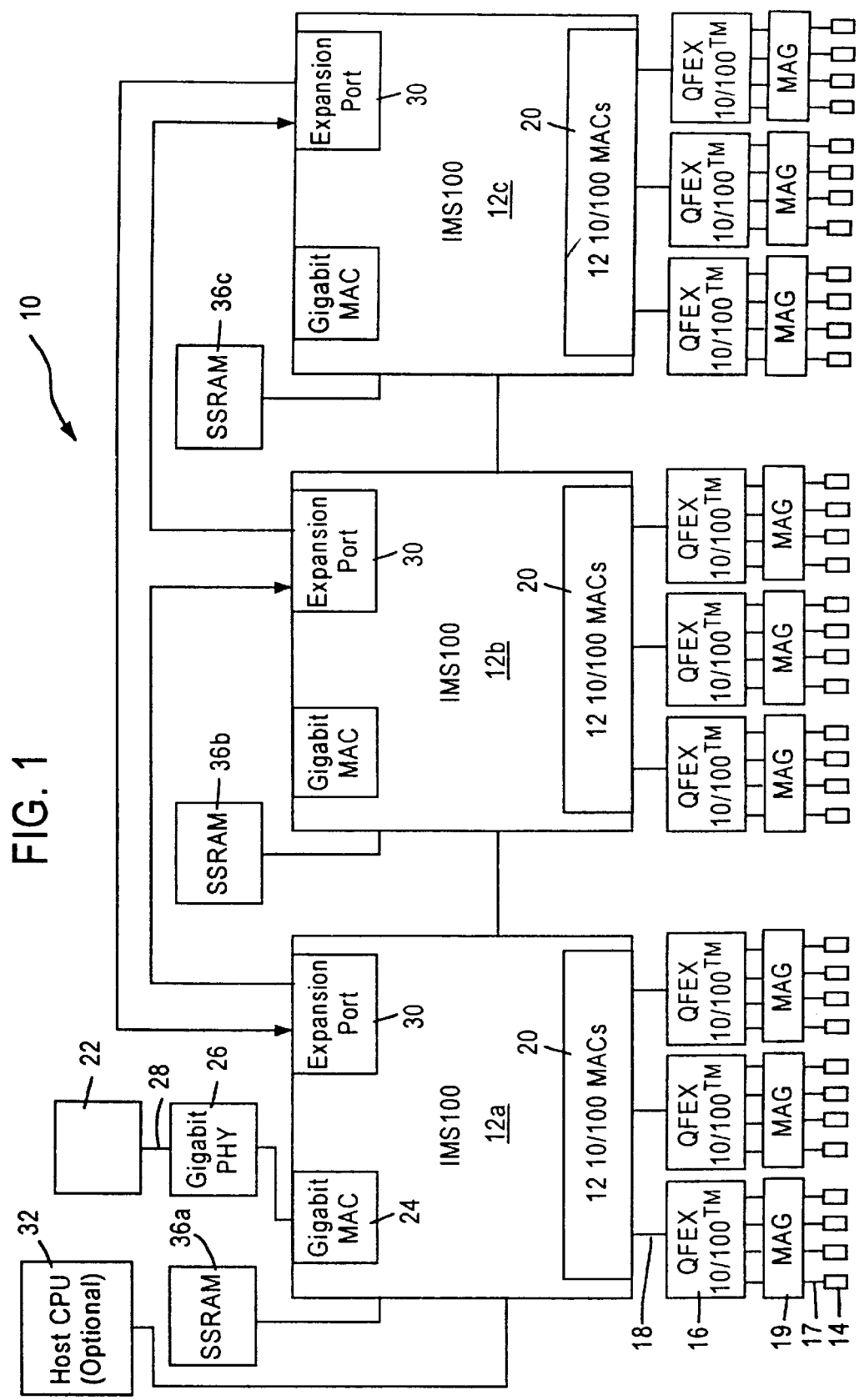
FIG. 1 is a block diagram of a packet switched network including a multiple port switch according to an embodiment of the present invention.

Switch Architecture Overview FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
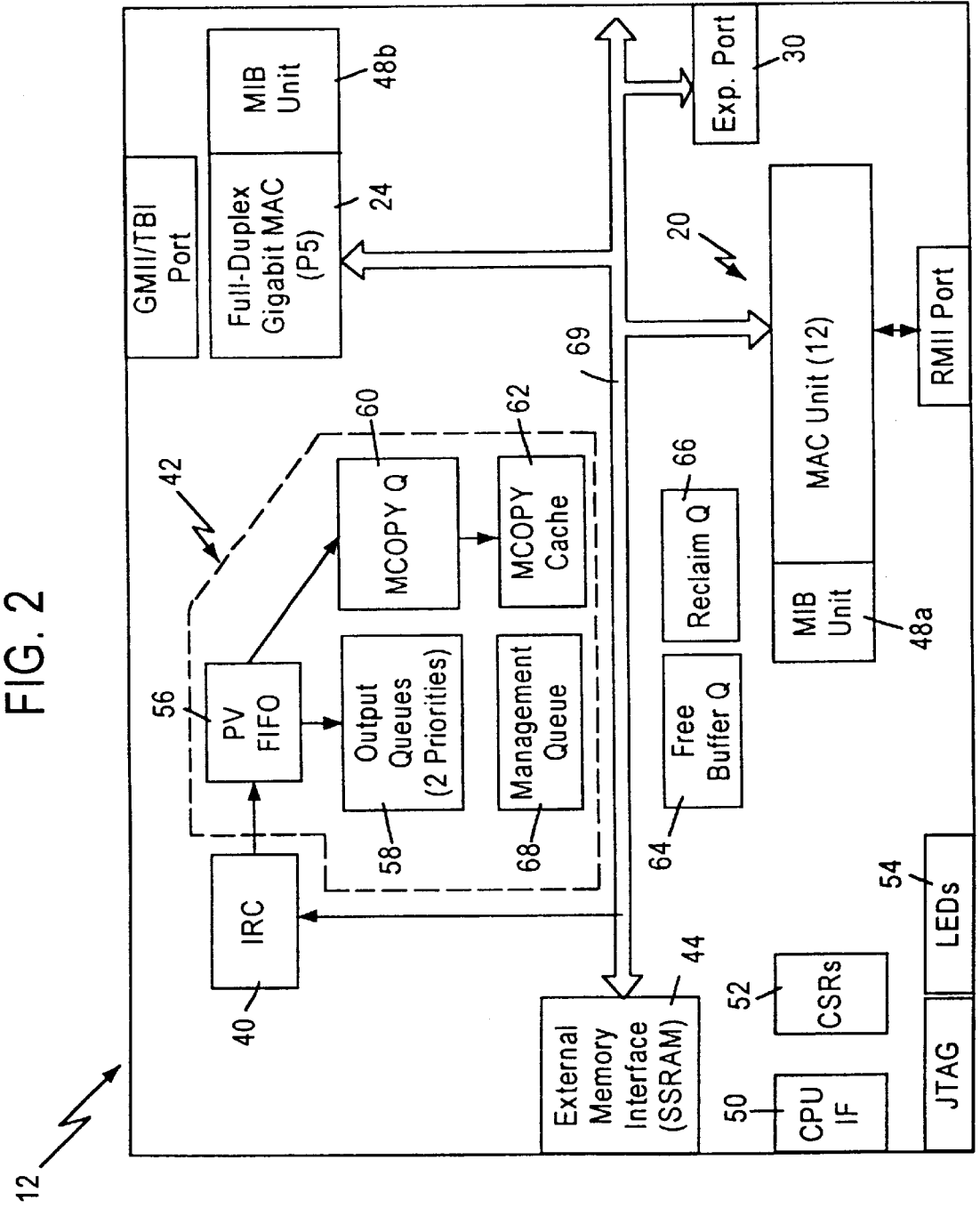
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
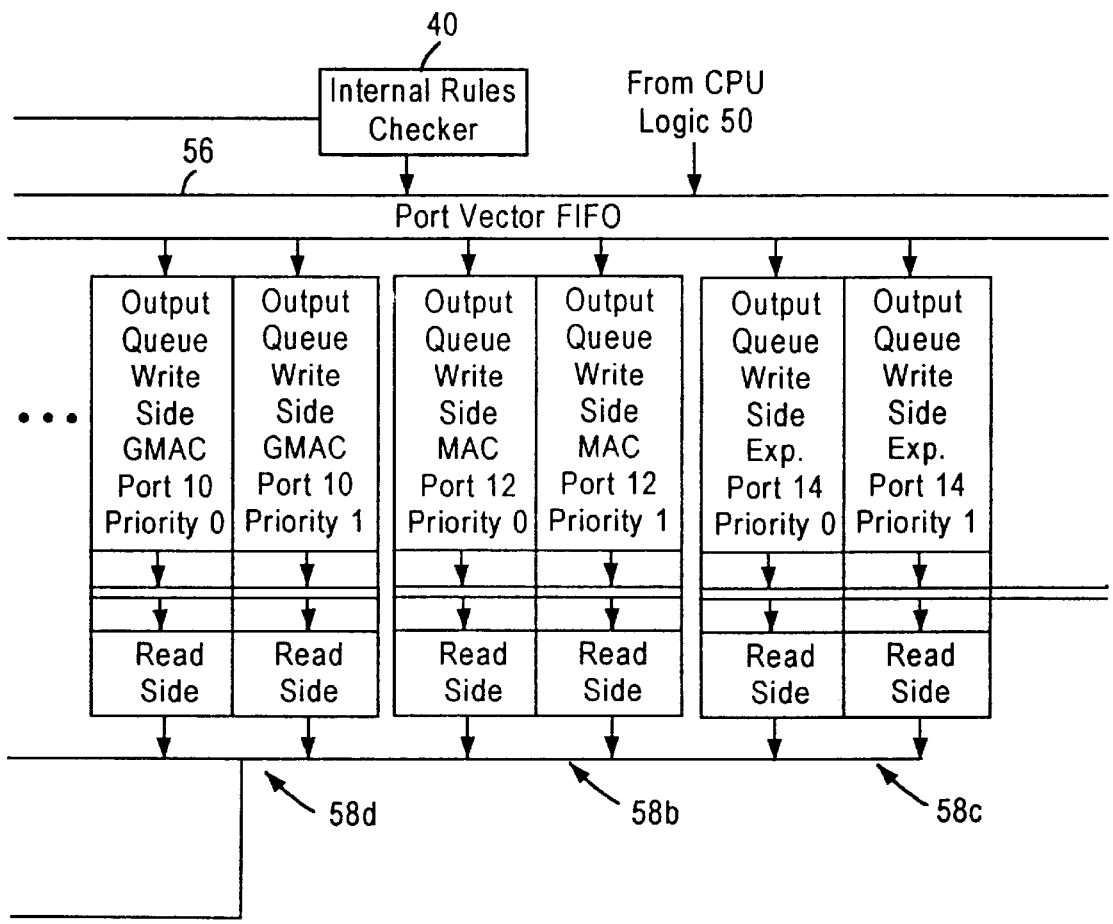
FIG. 3 is a block diagram illustrating in detail the switching subsystem of FIG. 2.
Figure 3C:
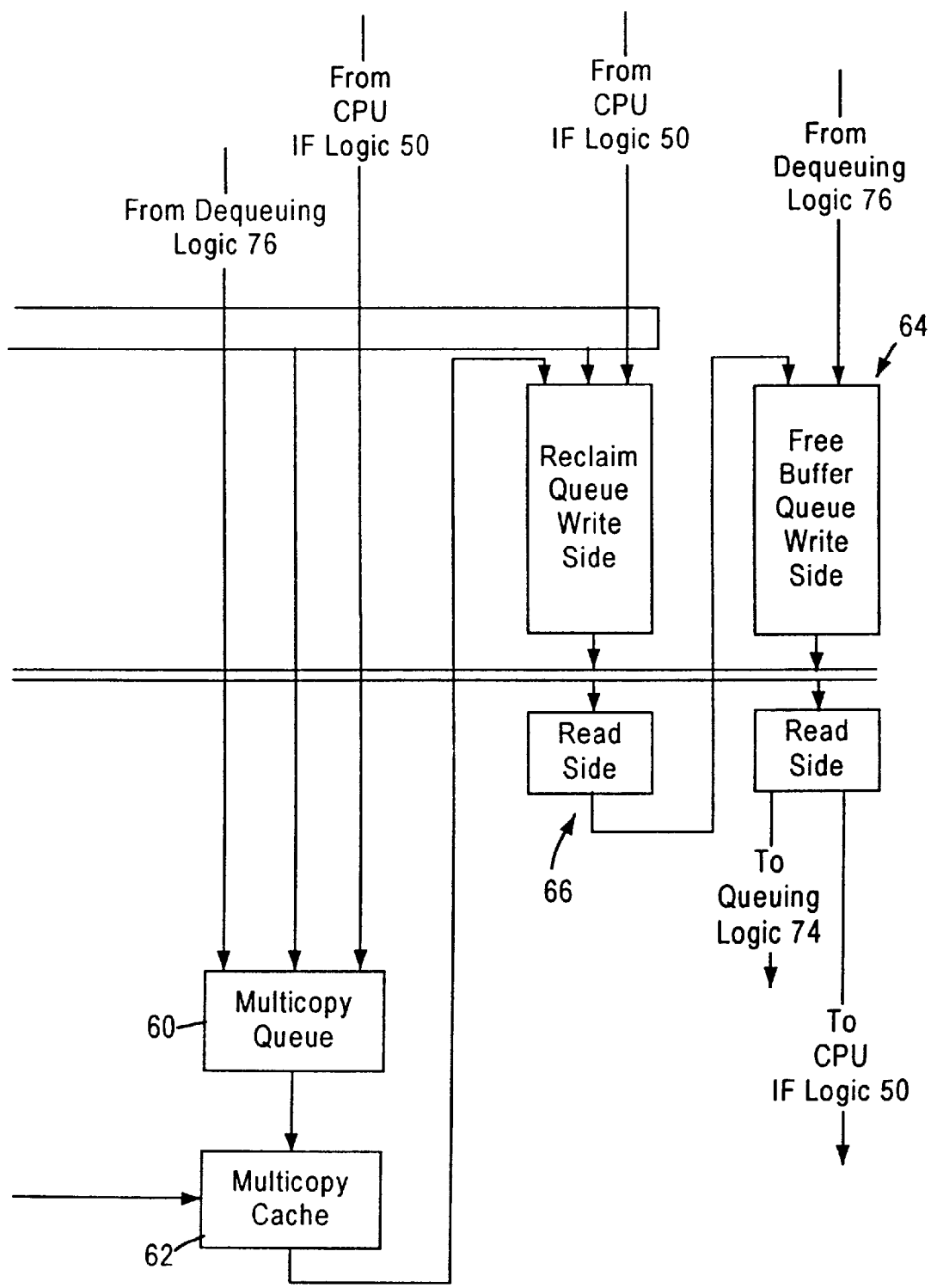

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and reuse of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62. When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of an exemplary queuing block will be discussed followed by details for transferring data from the network switch ports to the external memory utilizing the exemplary queuing block. Queuing Block Structure and Method As shown in FIG. 3, each MAC (70, 72*a* or 72*b*) includes a queuing logic 74 and a dequeuing logic 76. As described previously, the queuing logic block is responsible for transferring frame data between the MAC receive (Rx) FIFO's to the external memory 36. The queuing logic block 74 in each of the MAC's of the present embodiment, whether a 10/100 Mbps, 1 Gbps port or 1.2 Gbps port, have shared architectures. As will be described below, the queuing block 74 and accompanying method of operation afford the present invention a reduction in cost and complexity of the MAC due to linking buffer locations when storing a data frame.

Figure 4:
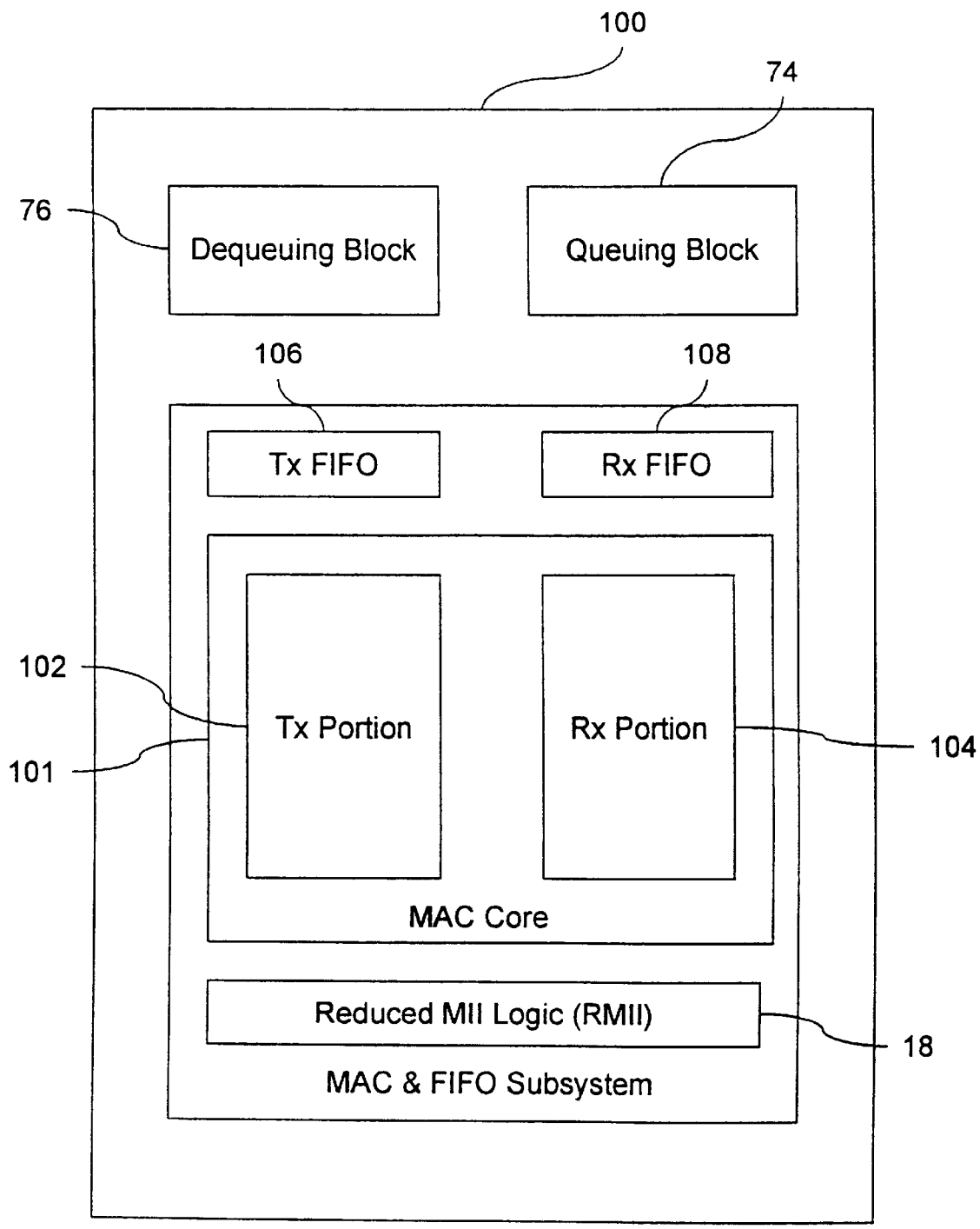
FIG. 4 is a block diagram of a network switch port system according to an embodiment of the present invention.

FIG. 4 illustrates an exemplary port module architecture including a queuing block 74 and a dequeuing block 76. In addition, the MAC core 101 includes a transmit portion 102 and a receive portion 104 being respectively associated with the dequeuing and queuing blocks (76 and 74, respectively). A transmit FIFO 106 is associated with the dequeuing block 76 for reading data from the external memory 36 and buffering data to be sent over the media 14 via the transit portion 102 and the reduced RMII logic 18. The queuing block 74 is associated with receiving data over the media 14 via the receive portion 104 and the receive FIFO 108 in order to write received data into the external memory 36.

Figure 5:
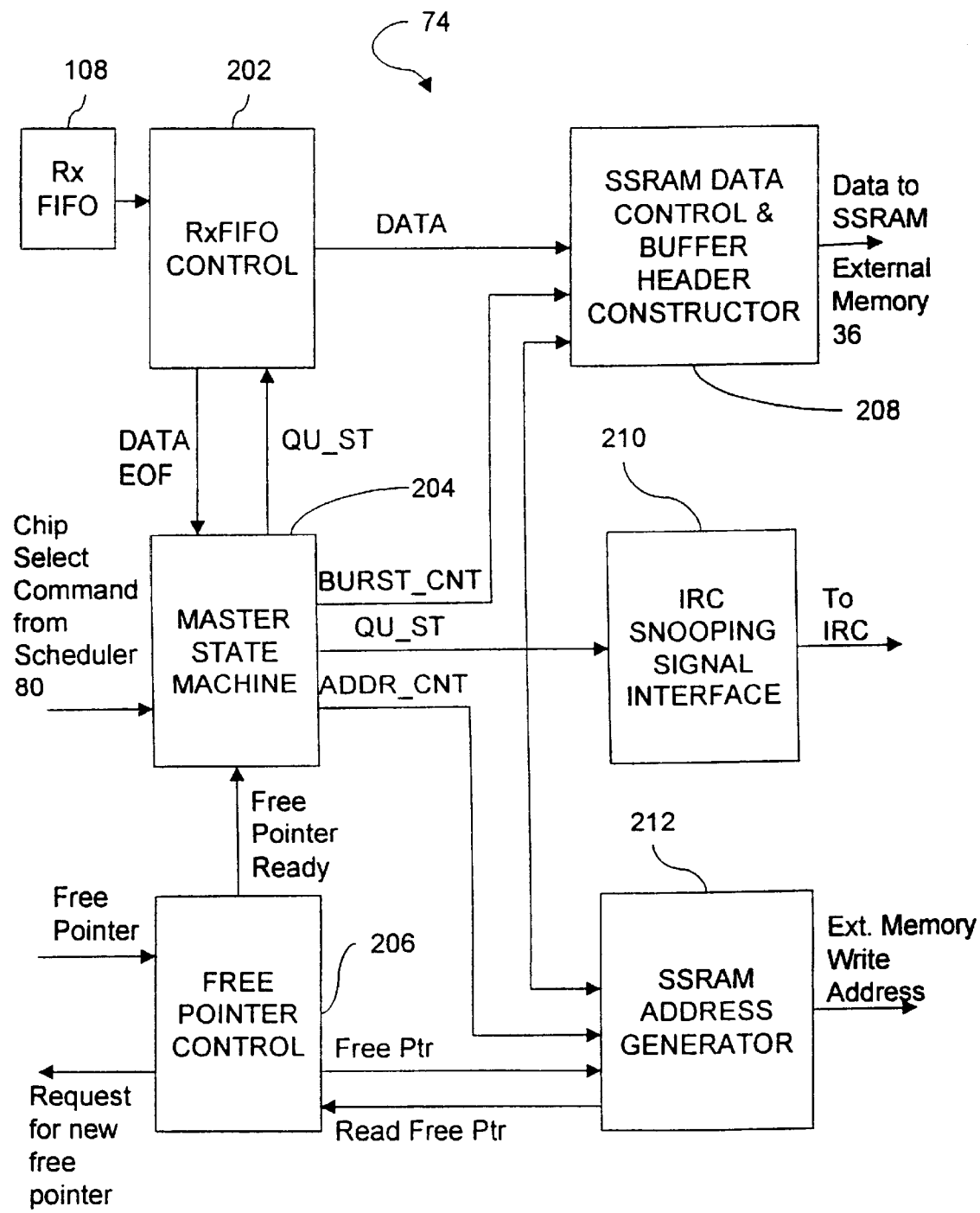
FIG. 5 is a block diagram of the queuing block portion of the network switch port system illustrated in FIG. 4.

In particular, a preferred embodiment of the queuing block 74 architecture is illustrated in the block diagram of FIG. 5. A receive FIFO control 202 receives data from the receive FIFO 108 and serves to control the reading of data from the receive FIFO 108. A master state machine 204 controls the queuing sequence as data is transferred from the receive FIFO 108 to the external memory 36 via, in part, the receive FIFO control 202. Free pointer control 206 is provided to receive free frame pointers used to address the data being stored in the external memory 36. In particular, the free pointer control 206 signals the master state machine 204 when a free pointer is ready and also delivers the free pointer to an SSRAM address generator 212. The address generator 212 provides an external memory write address indicating the location within the external memory 36 that the data is to be stored.

Additionally, as part of the data path, a SSRAM data control and buffer header constructor 208 constructs the buffer headers that are to be stored in each addressed buffer within the external memory 36. The constructor 208 constructs the buffer headers using data from the receive FIFO control 202 at the direction of the master state machine 204 via a signal QU_ST.

The signal QU_ST is used by the master state machine 204 to control the data path (i.e., the receive FIFO control 202 and the SSRAM data control and buffer header constructor 208) based on a chip select command received from the external memory interface scheduler 80. The chip select command communicates information to the master state machine 204 such as the data rate and the data path width for the port in which the particular state machine 204 is contained. For example, in a 100 Mbps port, the data path is 8 bytes wide and the scheduler 80 assigns a small number of available slots to the port during a schedule cycle. For a 1 Gbps port, the scheduler 80 might assign a much larger number of available slots to the port during a schedule cycle and the data path could be 16 bytes wide by granting external memory access for 2 consecutive clock cycles. Thus, dependent upon the data path width and data rate, the chip select signal from the scheduler 80 will vary in accordance with the particular port conditions it selects. The master state machine 204 issues the signal QU_ST in response to the chip select signal as a "master-slave" type relationship without regard to any particular reference clock signal. Hence, the state machine is scalable since it simply follows the chip select command without reliance on a common reference timing.

Additionally, the queuing block 74 includes an IRC snooping signal interface 210 that is controlled by the master state machine 204 with signal QU_ST. The IRC snooping signal interface 210 sends a signal to the IRC 40 to "snoop" the write bus 69*a* in order to prepare the forwarding descriptor, described previously.

Figure 6:
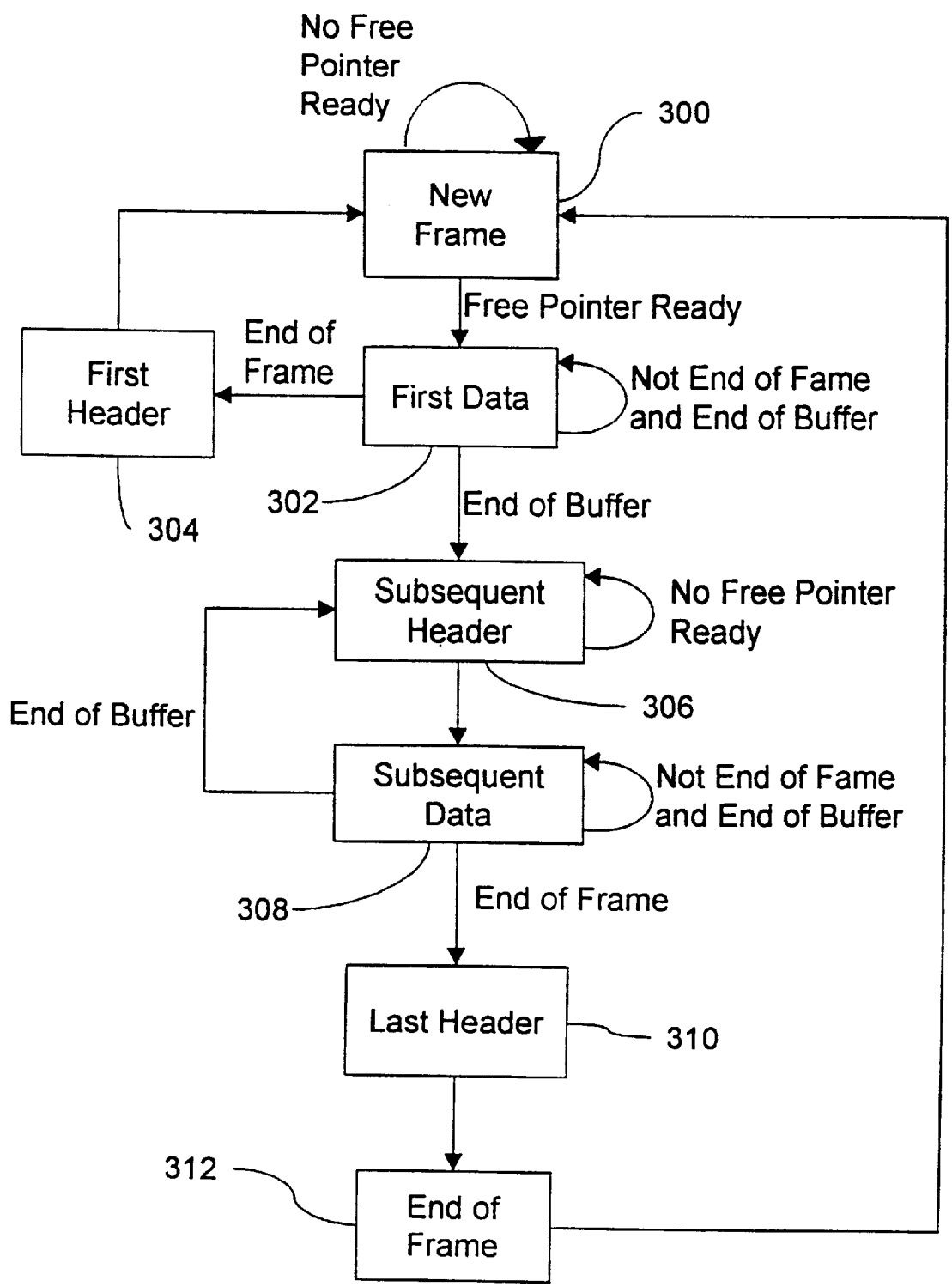
FIG. 6 is a state diagram illustrating the states of the master state machine of the queuing block portion illustrated in FIG. 5.

FIG. 6 illustrates a state diagram depicting the states executed by the master state machine 204. In an initial state 300, the master state machine 204 awaits a free pointer for a new data frame. If no free pointer is available, the state machine remains at state 300 until a free pointer is ready. In response to the free pointer ready signal from free pointer control 206, the master state machine 204 enters state 302 wherein data is written to the first buffer in the external memory 36.

While in state 302, the master state machine 204 continuously checks to determine if an end of frame (EOF) signal is received from the receive FIFO control 202 or an end of buffer (EOB) signal has been received from the buffer header constructor 208. If the master state machine 204 detects the end of frame signal before detecting an end of buffer for example, in a frame having less than 256 bits according to the preferred buffer size (i.e., storage size), the state machine proceeds to state 304 and instructs the SSRAM data control and buffer header constructor 208 to write a header into the buffer within the external memory 36. Alternatively, if the 256 bits of the buffer are filled without detecting an end of frame signal in state 302, indicating the entire data frame size exceeds the storage size of the buffer, the state machine 204 proceeds to state 306 wherein a header is written by the buffer header constructor 208 into the first buffer including the next frame pointer information. The state machine then determines whether a next free pointer is ready by monitoring whether the free pointer ready signal from the free pointer control 206 is asserted.

If a pointer is ready, the master state machine 204 proceeds to state 308 in which subsequent data is written by the SSRAM control and buffer header constructor 208 to corresponding subsequent buffer locations within the external memory 36. In response to the end of a buffer (EOB) being sent to the master state machine 204 by the buffer header constructor 208, the state machine 204 directs the buffer header constructor 208 to write header data into the subsequent buffer that has been filled. If, in state 308, the end of the data frame is detected through issuance of the end of frame signal from the receive FIFO control 202 to the master state machine 204, the state machine 204 proceeds to write header information into the buffer into which data was last written and proceeds to state 312.

At state 312, the master state machine 204 directs the buffer header constructor 208 to return to the first buffer header and write the total frame length, a beginning-of-frame bit indicating that this buffer contains the beginning of the frame, and a good frame bit indicating that the frame did not experience any receive errors. The state machine then proceeds back to state 300 for reception of a new data frame.

Figure 7:
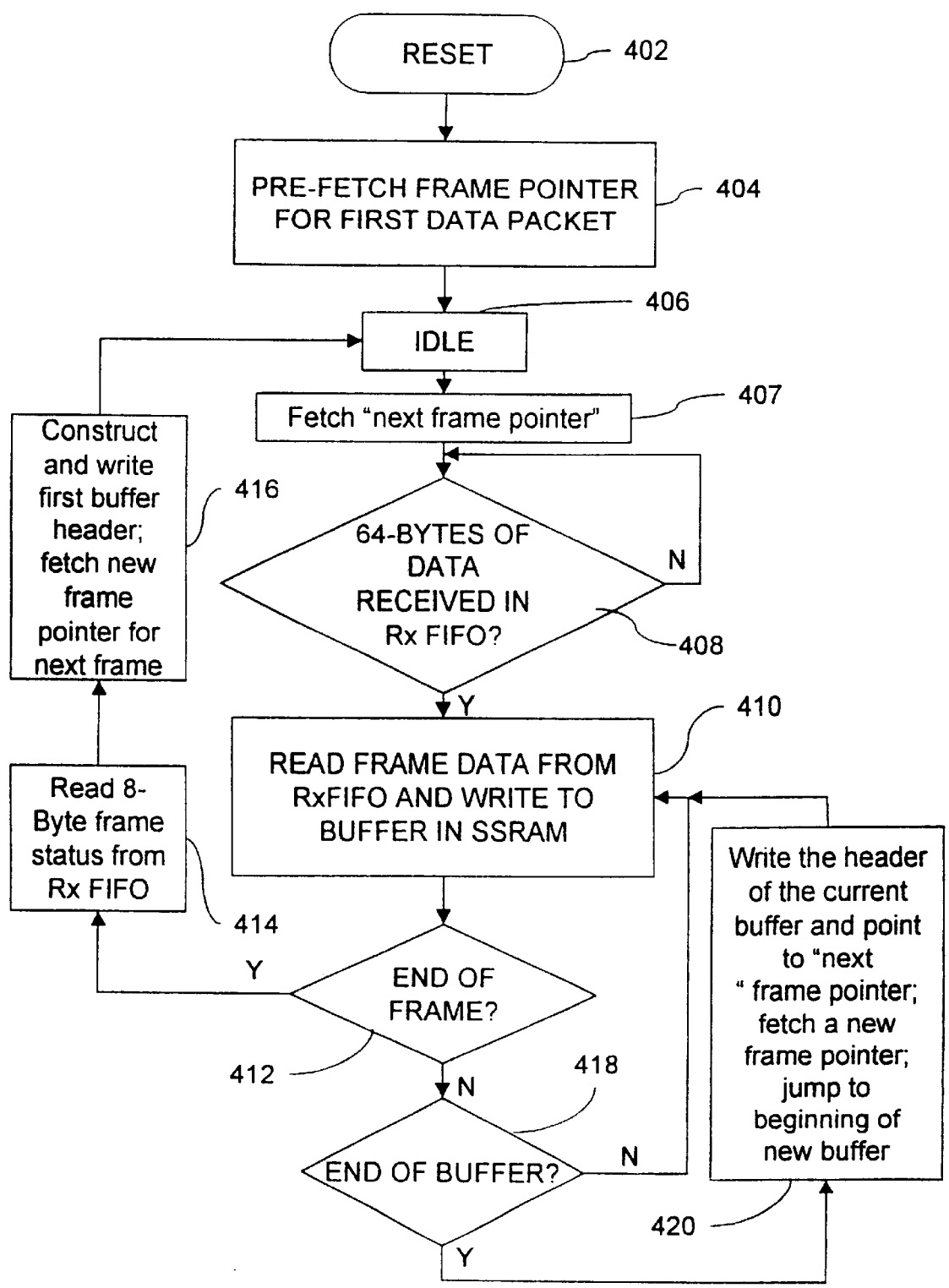
FIG. 7 is a flow diagram of the logic of the queuing block portion illustrated in FIG. 5.

FIG. 7 illustrates a flow diagram of the queuing block 74 operation as effected by the master state machine 204 and the accompanying logic blocks (e.g., 202, 206, 208, etc.). At steps 402 and 404, occurring during an initialization routine, the queuing block 74 is first reset and a frame pointer is pre-fetched by the free pointer control 206 from the free buffer queue 64 in anticipation of receiving a data frame into the receive FIFO 108. The queuing block 74 then enters an idle condition, shown at step 406. From the idle condition, the flow proceeds to step 407 in which a "next frame pointer" is fetched from the free buffer queue 64 in anticipation of forming a "linked list" data structure of external memory buffer locations within the headers of those buffers utilized.

In a preferred embodiment, the queuing block 74 then periodically checks at step 408 whether at least 64 bytes of the data frame have been received and buffered by the receive FIFO 108. When 64 bytes of the data frame are captured by the receive FIFO 108, the queuing block 74 proceeds to step 410 wherein the master state machine 204 directs the captured frame data to be read from the receive FIFO 108 and, in turn, written to the buffer address associated with the first frame pointer retrieved in step 404. As data is being written to the buffer location in the external memory specified by the first frame pointer, the queuing block 74 proceeds to check whether the all of the data in the data frame has been read (i.e., an end of frame condition) at step 412. As an example of this step, FIG. 8 visually illustrates this first buffer (i.e., storage location) 501, having a header section 518 and a data section 519. Preferably, the buffer stores 256 bytes of data, 16 bytes being used for the header section 518 and the remaining 240 bytes in the data section 519. Illustrated step 504 corresponds to the writing of data into the data section 519 during step 410 of FIG. 7.

Figure 8:
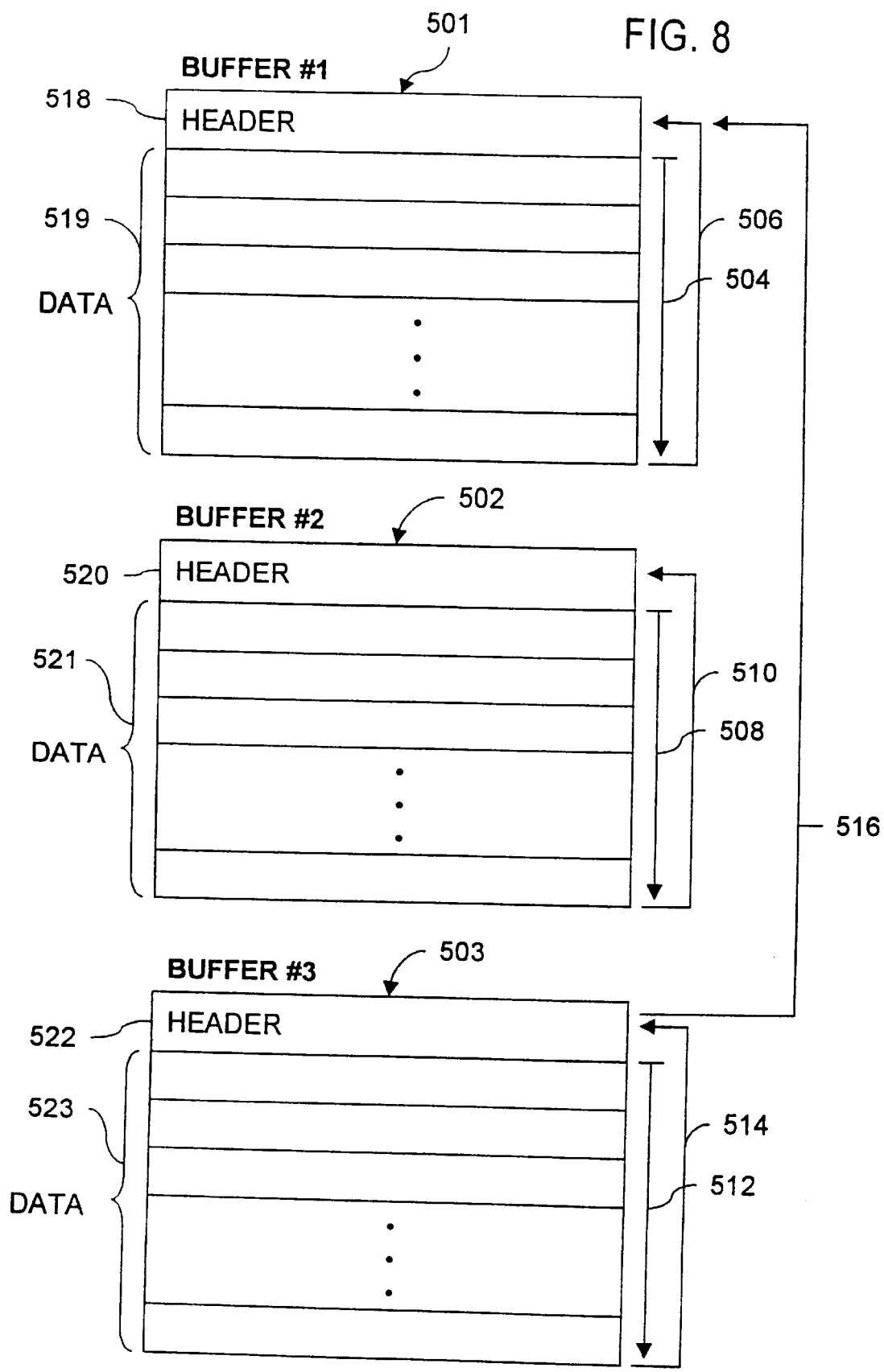
FIG. 8 is a representation of the external memory buffers according to an embodiment of the invention.

If the end of frame signal has not been detected, the queuing block 74 proceeds to step 418 (shown in FIG. 7) to check whether the buffer location in the external memory 36 has been filled (i.e., an end of buffer condition). If the buffer has not been filled, flow proceeds back to step 410 where the queuing block 74 continues to read data from the receive FIFO 108 and write it to the addressed buffer location in the external memory 36. If, at step 418, the end of the buffer is detected, the flow proceeds to step 420 where the buffer header constructor 208 (shown in FIG. 5) writes header information into the current storage location and inserts information identifying the "next buffer pointer" (retrieved in step 407) into the current storage location so as to point to the next addressed buffer location that will be used to continue storing the data frame. As an example of this step, FIG. 8 illustrates by step 506 that the queuing block 74 jumps from the end of the buffer data section 519 to the header section 518 to write the header information. Additionally, the queuing block 74 fetches another new frame pointer in anticipation of the event that yet another buffer will be required in order to store the data frame.

Figure 9:
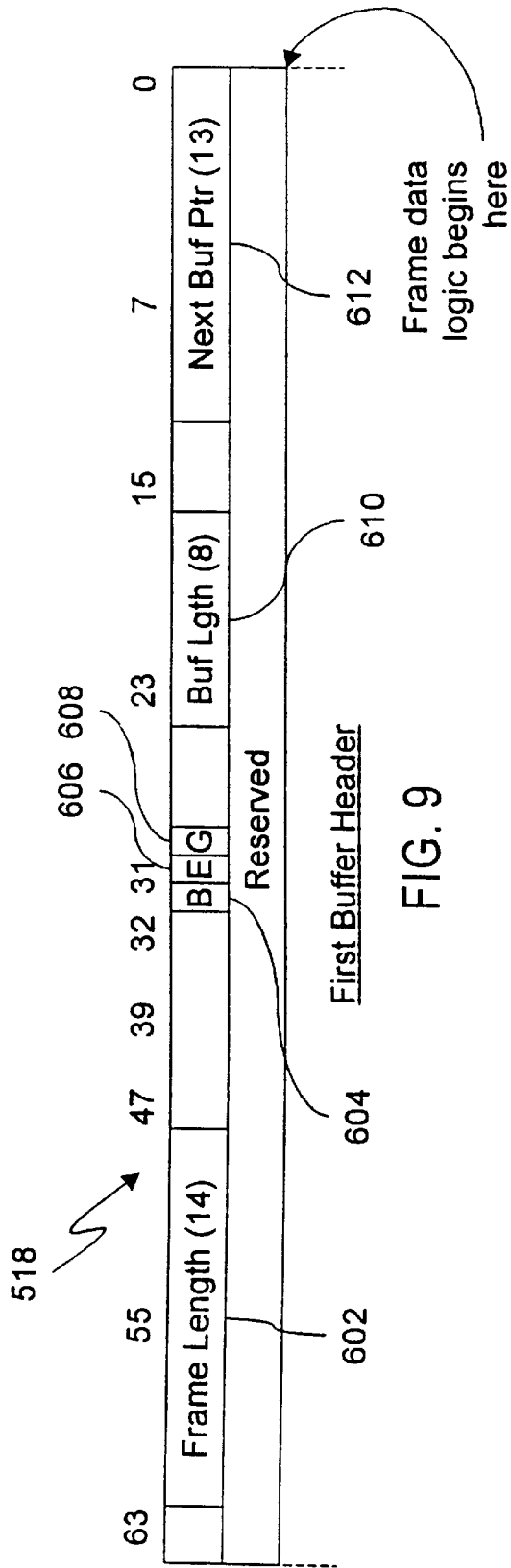
FIG. 9 is an illustration of a first buffer header according to an embodiment of the invention.

In a preferred embodiment, the buffer header constructor 208 generates and stores information as illustrated in FIG. 9 into buffer header 518 of the first buffer (i.e., storage location) 501. As shown, the first thirteen bits (i.e., bits 0–12, the bit numbers being shown above the frame) are used to store the next buffer pointer 612, which is the address pointer to the next buffer in the linked-list chain of buffers. Next, bits 16–23, indicated by reference number 612, are use to store the buffer length (i.e., number of bytes) of the buffer data portion (e.g., 519 as shown in FIG. 8). Bit 29 is a "Good Frame" bit 608 indicating that the data frame did not experience any received errors. An End of Frame Marker 606 is stored in bit 30 for indicating whether this is the last buffer for a frame. If the End of Frame Marker 606 is set (i.e., logic state "1"), there are not more buffers in the linked list chain and the content of the Next Buffer Pointer are, thus, undefined. Bit 31 is used for storing a Beginning of Frame bit 604 indicating that this is the first buffer and it contains the beginning of the frame. This Beginning of Frame bit 604 is set to logic state "1" in the first buffer used to store a frame and cleared to "0" in all other buffers in the linked list chain. Thus, the exemplary header in FIG. 9, being the first buffer header, would have a Beginning of Frame bit 604 set at "1".

Finally, bits 61–48 are used to store the total frame length 602 of a received frame. A frame length value is initially written into the first buffer header (e.g., 501) at step 420 of FIG. 7. However, as will be described below, these bits are later overwritten when the end of the data frame is reached and the actual total frame length is determined.

After step 420 in FIG. 7, flow proceeds back to step 410 wherein data from the data frame continues to be read into a subsequent buffer (e.g., storage location 502) until an end of buffer condition occurs. Illustrative of storage in this subsequent buffer, FIG. 8 shows a second buffer 502 having header 520 and data 521 sections. As indicated by arrow 508, data is read into the data portion 521 until it is filled. When the buffer 502 is filled, the queuing logic returns to the header, as indicated by arrow 510, to the header 520 to write the header information.

Figure 10:
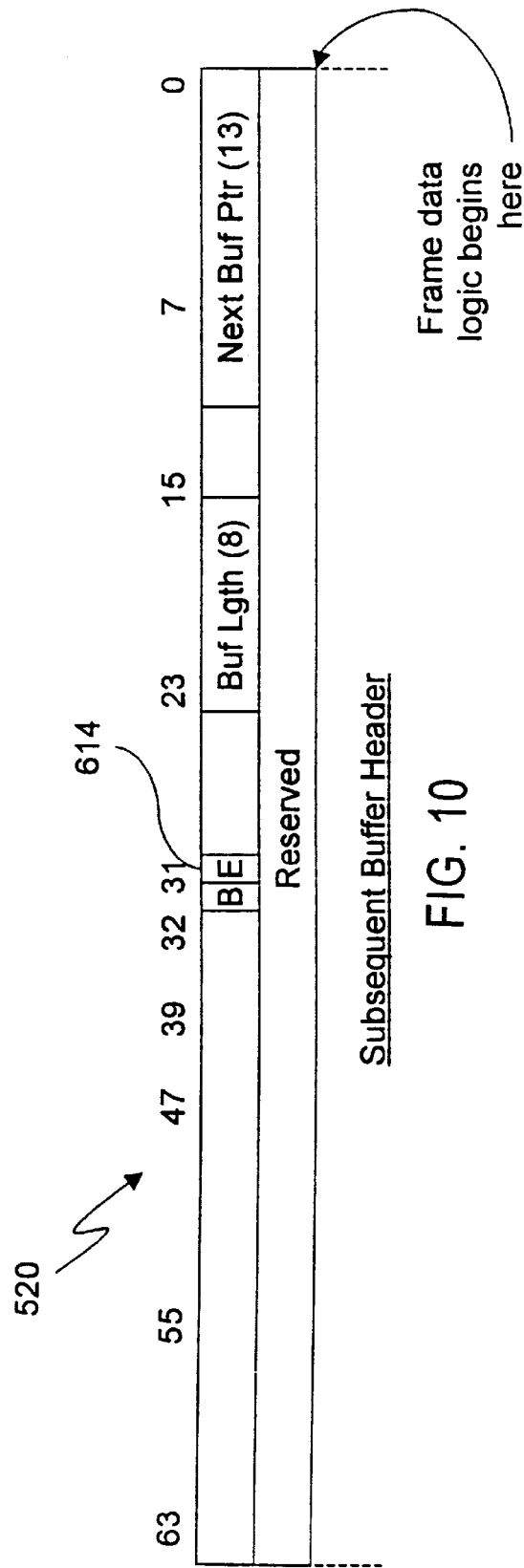
FIG. 10 is an illustration of a subsequent buffer header according to an embodiment of the invention.

FIG. 10 illustrates a preferred embodiment of this subsequent header 520, but is also indicative of all remaining buffer headers for buffers required to be link-listed in storing the data frame. The information stored in the header is the same as the first buffer header 518, except that a Good Frame Bit and frame length information are not required, since such information pertains to the frame as a whole. Therefore, only the first buffer requires this information. Furthermore, the last buffer header will differ from the previous buffer headers by setting the End of Frame Marker 614 to a logic value of "1" to indicate this is the last buffer used in storing the frame.

When an end of frame condition is detected by the master state machine 204 in step 412 of FIG. 7, the queuing block 74 proceeds to step 414 where an 8 byte frame status is read from the receive FIFO 108. The frame status indicates to the queuing block 74 whether any errors occurred in the reception of the data frame in order to determine the state of the Good Frame bit to be written in the first buffer header (608 in FIG. 9). At step 416 the final version of the first buffer header 518 is then constructed by the buffer header constructor (208 in FIG. 5) and overwritten into the first buffer header location in the first buffer 501. This step is illustrated in FIG. 8 by arrow 516. The final version of the first buffer includes writing the length of the data frame in bits 48–61.

After the final version of the first buffer header 518 is overwritten in the first buffer in the data frame, the logic of queuing block 74 fetches a new frame pointer for the next data frame to be received and returns to step 406 to await its reception.

The described apparatus and method of the present invention eliminates the need for a separate memory to store multiple buffer addresses used when storing large data frames by linking the addresses through storing the next buffer address in the header of a buffer. Thus, the complexity and cost of a network switch employing the present invention is reduced.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of storing received data in a memory of a network switch, comprising the steps of:

retrieving first and second memory address pointers from a plurality of available memory address pointers specifying respective storage locations in a memory, each storage location having a prescribed storage size;

receiving at least a portion of a data frame from a network media;

writing at least a first portion of the received data frame into a first storage location specified by the first memory address pointer; and if the entire data frame has a size that exceeds the prescribed storage size of the specified memory location:

(1) writing a second portion of the received data frame into a second storage location specified by the second memory address pointer; and (2) writing header information identifying the second memory address pointer into the first storage location specified by the first memory address pointer;

writing a length of the data frame into the first storage location when two or more storage locations are required to store the data frame and after the data frame has been fully stored within the two or more memory locations.

2. The method according to claim 1, wherein the step of writing header information further comprises:

writing a frame beginning bit identifying the first storage location as a beginning storage location.

3. The method according to claim 2, wherein the frame beginning of bit is set at a predetermined logic state to identify the beginning storage location.

4. The method according to claim 1, wherein the step of writing second header information further comprises:

writing an end of frame marker into a last memory location when two or more storage locations are required for storing the data frame.

5. A network switch comprising:

at least one network switch port configured for receiving data frames from network nodes; and a queuing block within the at least one network switch port for addressing, transmitting and storing received data frames in an external memory, the queuing block configured to segment and store each data frame in one or more memory locations within the external memory and write header information into each memory location, the header information including a memory location pointer to a subsequent memory location when two or more memory locations are required to store a single data frame;

wherein the queuing block further comprises a header constructor configured for constructing the header information written to each memory location; and wherein the header constructor is configured for writing a frame length into a first memory location header when two or more memory locations are required for storing the single data frame.

6. The apparatus of claim 5, wherein the queuing block further comprises:

an address generator that generates one or more memory location addresses to be used by the queuing block for storing each data frame in the external memory.

7. The apparatus of claim 5, wherein the header constructor is configured for writing a frame beginning bit into the first memory location header.

8. The apparatus of claim 5, wherein the header constructor is configured for writing a frame end bit into a last memory location header to be written to a last memory location when two or more memory locations are required for storing the single data frame.

9. The apparatus of claim 5, wherein the header constructor is configured to assemble and write data from data frames into one or more memory locations in the external memory.

10. The apparatus of claim 5, wherein the queuing block is configured to receive data frames from a port receive buffer.

11. The apparatus of claim 5, wherein the queuing block further comprises:

a memory pointer controller configured for retrieving memory location pointers from a plurality of available memory location pointers and delivering the memory location pointer to the queuing block.

12. The apparatus of claim 5, wherein the queuing block further includes a master state machine controlling the operation of the queuing block.

13. The apparatus of claim 6, wherein the queuing block further includes a master state machine for controlling the operation of the address generator within the queuing block.

14. The apparatus of claim 5, wherein the queuing block further includes a master state machine for controlling the operation of the header constructor within the queuing block.

15. The apparatus of claim 11, wherein the queuing block further includes a master state machine for sensing when a memory pointer is retrieved by the memory pointer controller and controlling the operation of the queuing block based upon the sensed retrieval of the memory pointer by the memory pointer controller.

* * * * *